H. S. JOHNSON.
CHUCK.
APPLICATION FILED NOV. 2, 1905.
932,709.
Patented Aug. 31, 1909.
5 SHEETS—SHEET 1.
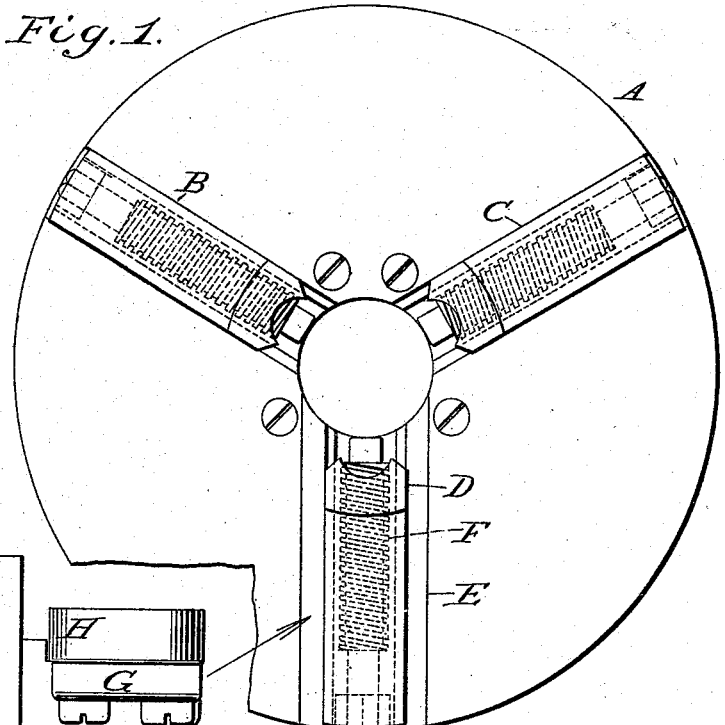
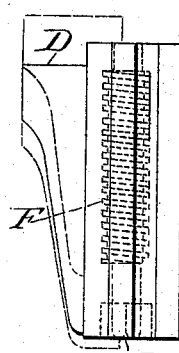
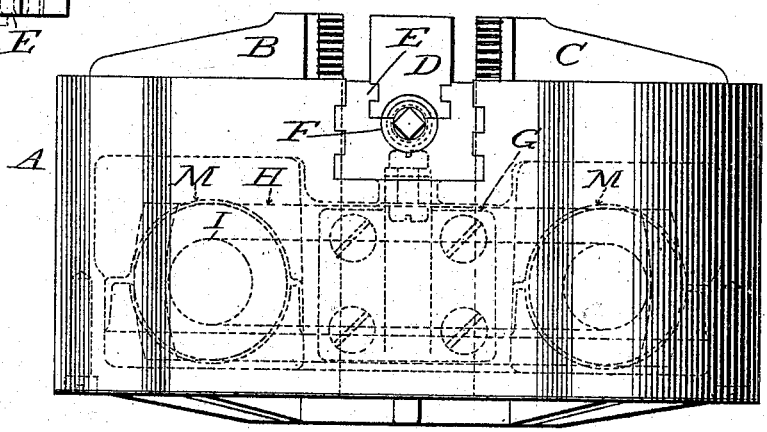

H. S. JOHNSON.
CHUCK.
APPLICATION FILED NOV. 2, 1905.

932,709.

Patented Aug. 31, 1909.
5 SHEETS—SHEET 2.

H. S. JOHNSON.
CHUCK.
APPLICATION FILED NOV. 2, 1905.

932,709.

Patented Aug. 31, 1909.
5 SHEETS—SHEET 3.

H. S. JOHNSON.
CHUCK.
APPLICATION FILED NOV. 2, 1905.

932,709.

Patented Aug. 31, 1909.
5 SHEETS—SHEET 4.

Witnesses

Inventor:
Hobart S. Johnson,
By Dodge and Sons,
Attorneys

H. S. JOHNSON.
CHUCK.
APPLICATION FILED NOV. 2, 1905.
932,709.
Patented Aug. 31, 1909.
5 SHEETS—SHEET 5.
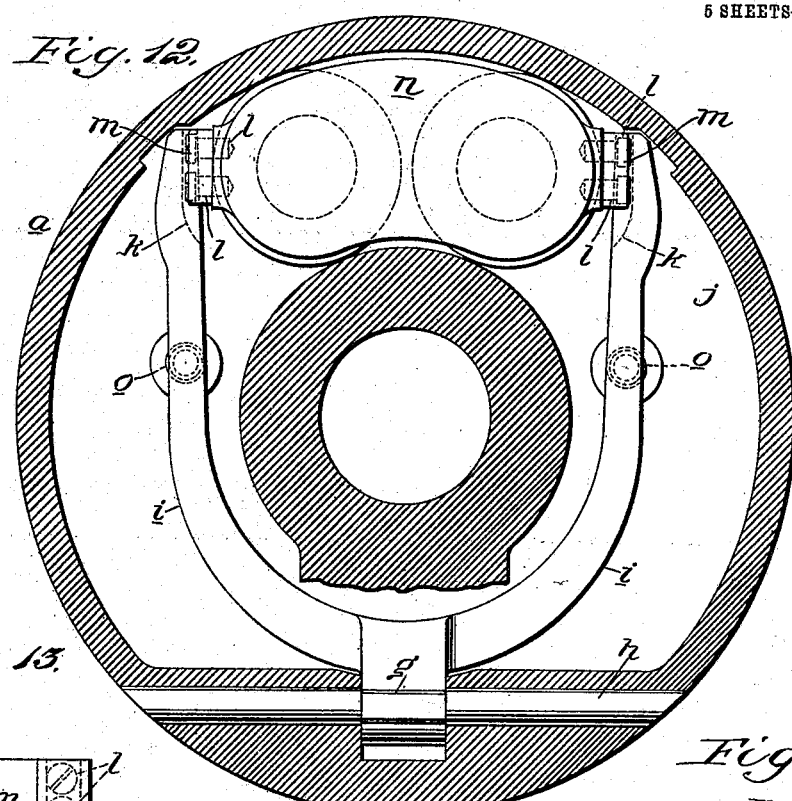
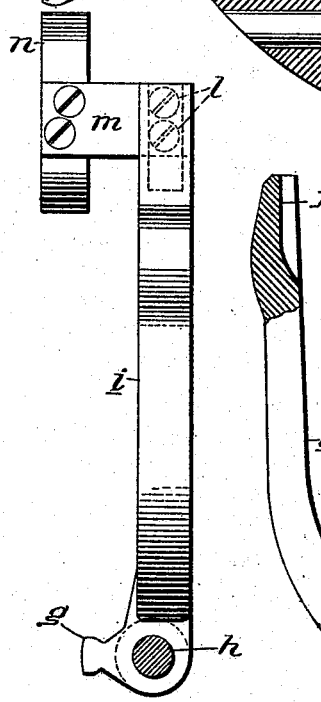
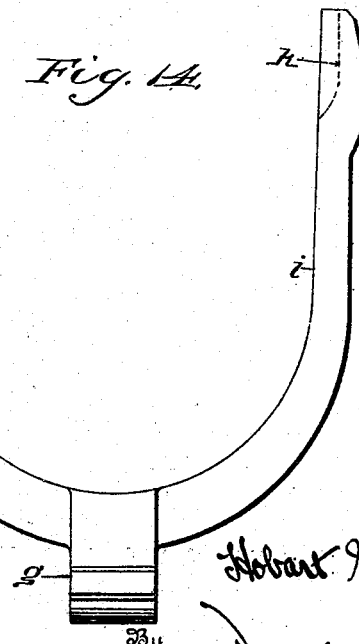
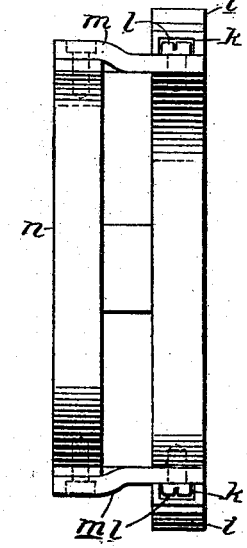

UNITED STATES PATENT OFFICE.

HOBART S. JOHNSON, OF MADISON, WISCONSIN, ASSIGNOR TO GISHOLT MACHINE COMPANY, OF MADISON, WISCONSIN, A CORPORATION OF WISCONSIN.

CHUCK.

932,709.        Specification of Letters Patent.     Patented Aug. 31, 1909.

Application filed November 2, 1905. Serial No. 285,638.

*To all whom it may concern:*

Be it known that I, HOBART S. JOHNSON, a citizen of the United States, residing at Madison, in the county of Dane and State of Wisconsin, have invented certain new and useful Improvements in Chucks, of which the following is a specification.

Figure 4:
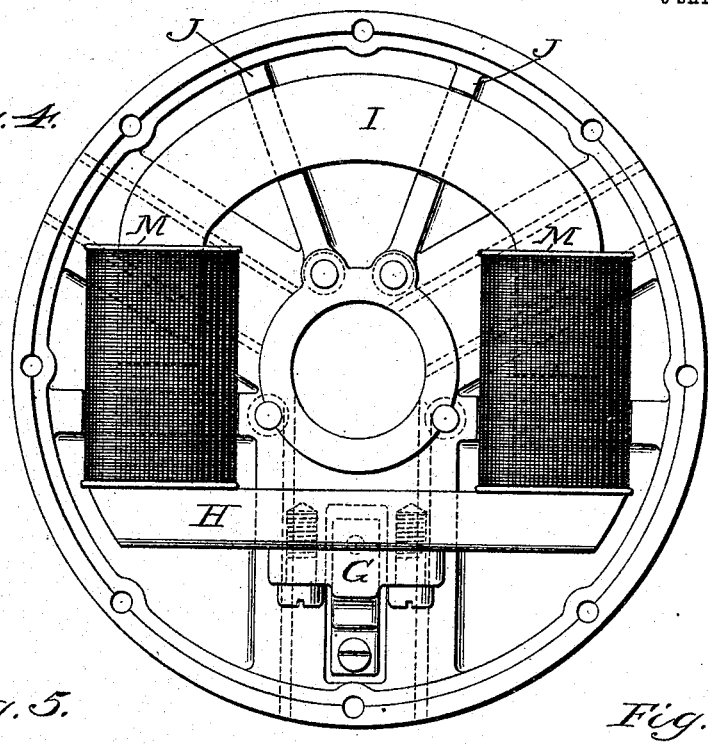
Figures 5, 6:
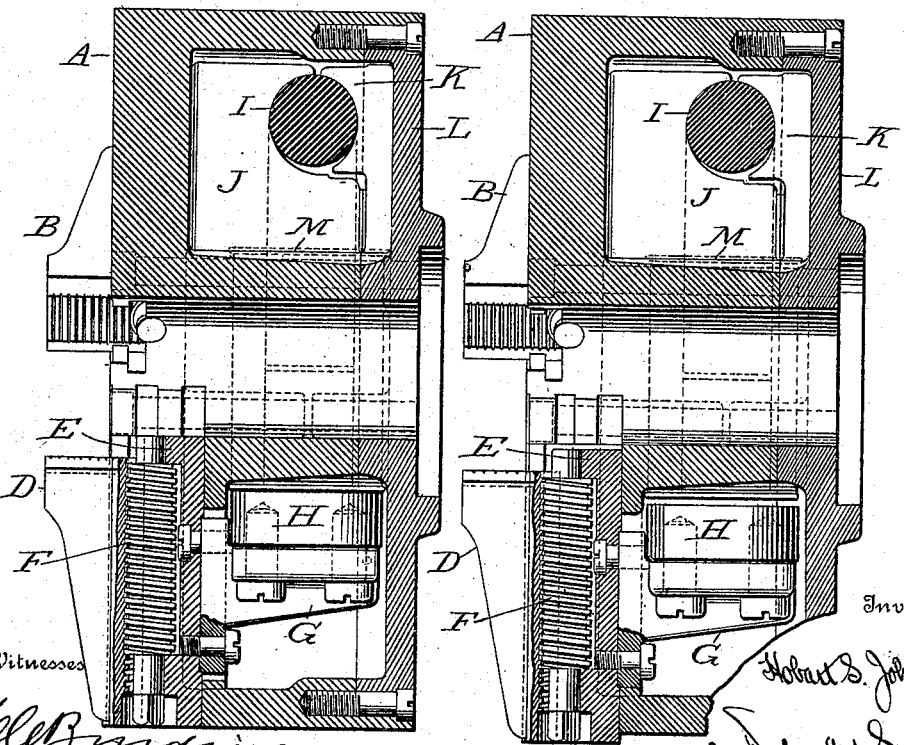
Figure 7:
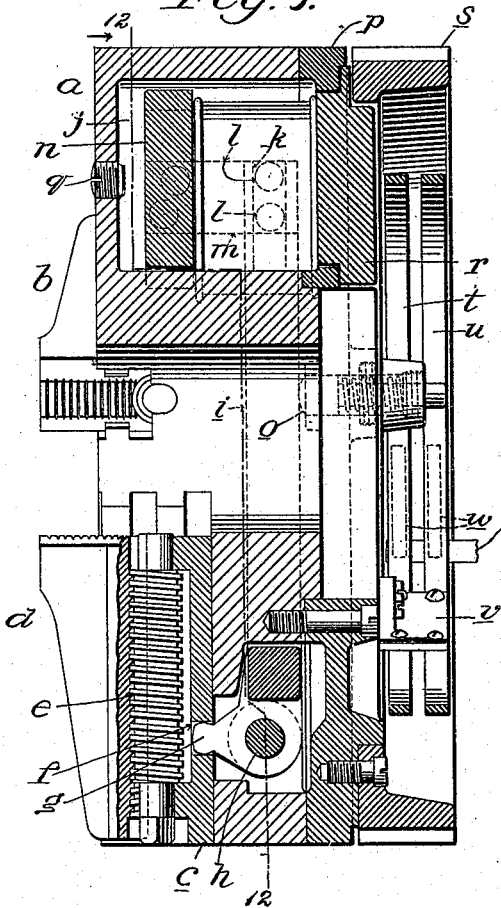
Figure 8:
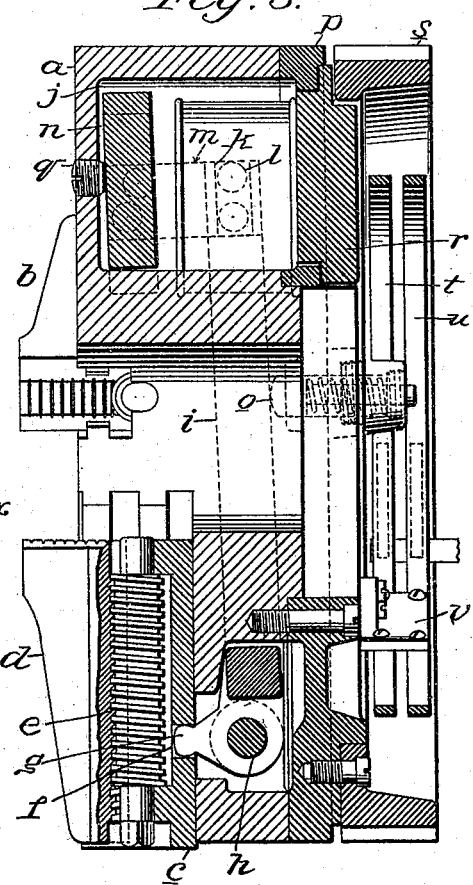
Figure 9:
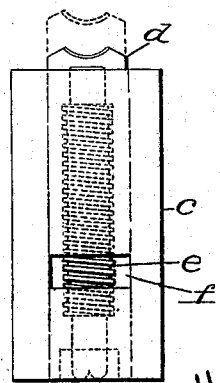
Figure 10:
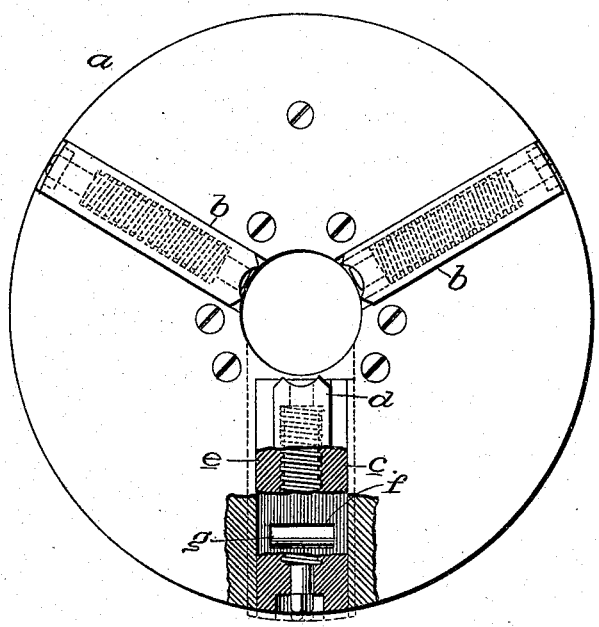
Figure 11:
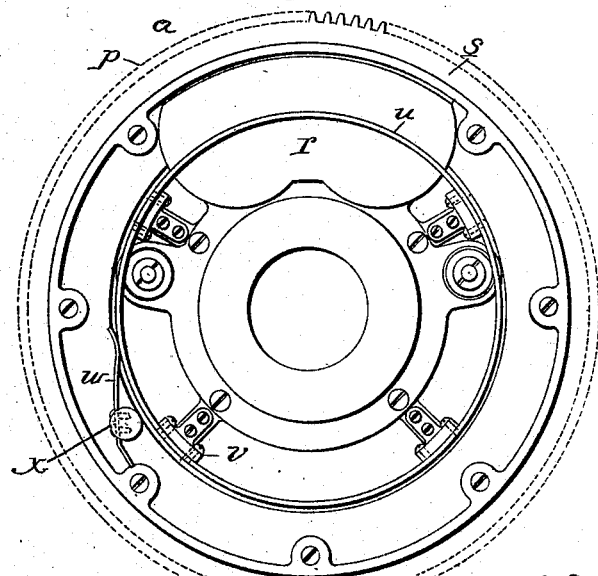

My present invention relates to improvements in chucks, the construction and advantages of which will be hereinafter set forth, reference being had to the annexed drawings, wherein:

Figure 1 is a front elevation of a chuck embodying my invention; Fig. 2 a side elevation of the electrically-actuated jaw, its slide or carriage, and the attached armature; Fig. 3 a side elevation of the chuck; Fig. 4 a rear elevation of the chuck, with the back or cover-plate removed; Fig. 5 a vertical sectional view showing the armature and jaw elevated; Fig. 6 a similar view with the jaw lowered; Fig. 7 a vertical sectional view of a modified form of construction, the jaw and armature being raised; Fig. 8 a like view, with the jaw lowered; Fig. 9 a rear elevation of the slide or carriage and the jaw mounted thereon; Fig. 10 a front face view of the chuck, partly broken away; Fig. 11 a rear elevation of the same; Fig. 12 a transverse vertical sectional view, on the line 12—12 of Fig. 7; Fig. 13 a side elevation of the actuating lever and the connected armature; Fig. 14 a front elevation of said lever; and Fig. 15 a top plan view of the lever and the armature.

The main object of the present invention is to provide a chuck with an electrically-actuated jaw or jaws.

A further object is to furnish a chuck having one or more jaws which may have means for mechanical adjustment with reference to the other jaw or jaws, the final grasping or clamping action of said first jaw or jaws being secured by the action of one or more electro-magnets or the like.

A still further object of the invention is to employ a power-multiplying device intermediate the jaw and its actuating electro-magnet (or motor).

The advantages which arise from the constructions by which these objects are attained, as well as other advantages, will hereinafter appear.

Referring first to the construction shown in Figs. 1 to 6 inclusive, A denotes the body of the chuck, which is provided with the usual radially-adjustable jaws B and C, and with a third jaw D, mounted upon a slide or carriage E, which works in suitable ways formed in the chuck body. Jaw D may be adjusted lengthwise upon the slide by a screw F. Secured to and extending inwardly from the slide is a bracket G, to which in turn is secured an armature H, which stands immediately below the ends of an electro-magnet. The core-piece I of said magnet is secured between ribs J, formed upon the chuck body, and similar ribs K carried by back-plate L of the chuck. The coils M of the magnet likewise extend into recesses formed in the adjacent ribs, see dotted lines Fig. 3 and full lines Fig. 4. Suitable leading-in wires will be employed to convey current to the coils, the terminals of the wires making wiping contact with brushes located exterior to the chuck, as will be readily appreciated by those skilled in the art. The same underlying principle is involved in the construction illustrated in Figs. 7 to 15 inclusive. In said figures, *a* denotes the body of the chuck, which is provided with two radially-disposed, manually-adjustable jaws *b*, *b*, and having also a slide or carriage *c* movable in radially-extending ways formed in the body of the chuck, which slide carries a third jaw *d*. Said jaw is adjustable relatively to the slide or carriage by a screw *e*, as in the former construction. The slide or carriage is formed with an opening *f* in its rear face, into which extends the nose or short arm *g* of an elbow lever, said lever being fulcrumed upon a through-pin *h*, and its upper end being forked or U-shaped, forming arms *i*, *i*. Said arms *i*, *i* pass to each side of the central hollow portion *j* of the body and are provided with seats or sockets *k* in their upper ends, into which extend the heads of bolts or tap-screws *l*. Said screws are carried by arms *m*, which in turn are secured to the ends of an armature *n*. Normally the armature is held forward toward the face of the chuck by means of adjustable, spring-pressed plungers *o*, mounted in the back plate *p* of the chuck. A screw *q*, mounted in the face of the chuck in line with the armature serves to limit the forward movement of the armature, see Fig. 8. An electro-magnet *r* is mounted in the back plate in line with the armature, being held in place by an overlying driving gear ring *s*.

The current employed to energize the magnet is led thereto from contact-rings *t* and *u*, carried by a bracket *v*, secured to the back plate. Brushes *w*, carried by a post *x*, and connected to any suitable source of current supply, make contact with the rings *t* and *u*.

The operation of the apparatus is apparent. The jaws being given their initial mechanical adjustment, current is turned on, which immediately energizes the magnet and causes the armature to be attracted, thereby moving the jaw carried by the slide into binding contact with the work designed to be held by the chuck. When it is desired to loosen the hold of the jaws, it is simply necessary to break or interrupt the circuit.

With the modified form of construction, or that last described, the action of the jaw mounted upon the carriage is quite powerful, this being due to the lever arrangement employed.

It is manifest that a plurality of electrically-operated jaws may be used. It has not, however, been deemed essential to illustrate such a construction, as this would involve merely a duplication of the parts. It is likewise evident that the principle of operation herein described may be readily applied to chucks of other than the specific forms shown, and the broader or generic claims are designed to cover such constructions as well as those specifically described.

Having thus described my invention, what I claim is:

1. In a chuck, the combination of a body; a relatively fixed jaw or jaws; a relatively free jaw; and an electro-magnet carried by the body, adapted to move the free jaw and to hold it in its working position.

2. In a chuck, the combination of a body; a mechanically adjustable jaw carried thereby; a second jaw, said second jaw being relatively free; and an electro-magnet carried by the body, adapted to move the free jaw and to hold it in its working position.

3. In a chuck, the combination of a body portion; a jaw; means for securing mechanical adjustment of said jaw; a second jaw; and an electro-magnet working in conjunction with said second jaw to move the same toward the opposite jaw and to maintain it in such position, substantially as described.

4. In a chuck, the combination of a body portion; a jaw carried thereby; a carriage mounted in suitable ways formed in the body portion; a jaw secured to said carriage; and an electro-magnet serving to move the carriage and to bring the jaw secured thereto into working relation with the other jaw, substantially as described.

5. In a chuck, the combination of a body portion; a jaw; mechanical adjusting means for said jaw; a second jaw; an electro-magnet carried by the body portion; and an interposed power mechanism intermediate the electro-magnet and the second jaw for operating said jaw and moving it toward the other jaw, substantially as described.

6. In a chuck, the combination of a body portion; a slide or carriage mounted in ways formed in said body portion; a jaw mounted upon the carriage; means for securing adjustment of the jaw relatively to the carriage; and an electro-magnet carried by the body portion and adapted and arranged to move the carriage and to thereby bring the jaw into operative position.

7. In a chuck, the combination of a body portion; a slide or carriage mounted and movable in ways formed in said body portion; a jaw supported by the carriage; an electro-magnet carried by the body portion; and an armature connected with the carriage, standing in line with the electro-magnet, and adapted to be attracted thereto when current is passed through the magnet, whereby the carriage may be moved to properly position the jaw, substantially as described.

8. In a chuck, the combination of a body portion; a slide or carriage mounted in ways formed therein; a jaw mounted upon said carriage; an electro-magnet carried by the body portion; a lever fulcrumed on the body portion and having its short arm in operative relation with the carriage; an armature connected to the upper end of the long arm of the lever; and means for passing current to the coils of the magnet.

9. In a chuck, the combination of a body portion; a slide or carriage mounted and movable in ways formed therein; a jaw mounted on the carriage; means for securing adjustment of the jaw relatively to the carriage; an electro-magnet carried by the body portion; a lever fulcrumed upon the body portion adjacent to the carriage and having its short arm in operative relation with said carriage; an armature secured to the long arm of the lever, said armature standing in line with the electro-magnet; and means for passing current to the coils of said magnet.

10. In a chuck, the combination of a body portion; a slide or carriage mounted and movable in ways formed in the body portion; a jaw mounted upon the carriage; means for securing adjustment of the jaw relatively to the carriage; an elbow lever fulcrumed upon the body portion and provided with a short arm adapted and arranged to engage the carriage, and with an upwardly-extending, U-shaped long arm, the upper ends of the opposite members of the long arm being formed with seats or sockets; an armature; arms secured to the ends of said armature; tap-screws extending outwardly from the ends of said arms into the seats or sockets formed in the ends of the U-shaped arm; and an electro-magnet secured in the body portion of the chuck in line with the armature, substantially as described.

11. In a chuck, the combination of a body portion; a jaw carried thereby; a lever fulcrumed upon the body of the chuck and having one end in operative relation with the jaw; an armature carried by the opposite end of the lever; an electro-magnet standing in line with the armature; and means for normally withdrawing the armature from the electro-magnet.

12. In a chuck, the combination of a body portion; a jaw carried thereby; a lever fulcrumed upon the body of the chuck, one end of said lever being in operative relation with the jaw; an armature carried by the opposite end of the lever; an electro-magnet standing in line with said armature; means for normally withdrawing the armature from the electro-magnet; and means to limit the extent of such movement.

13. In a chuck, the combination of a body portion; a jaw carried thereby; a lever fulcrumed upon the body portion, one end of said lever being in engagement with the jaw; an armature carried by the opposite end of the lever; an electro-magnet mounted upon the body portion and standing in line with the armature; a spring-pressed plunger acting upon the lever and serving to withdraw the armature from the magnet; and means to limit the extent of such movement.

14. In a chuck, the combination of a body portion; a slide or carriage mounted in ways formed therein; a jaw mounted upon said carriage; an elbow lever fulcrumed upon the body portion and having its short arm in engagement with the carriage, the upper end of the long arm of the lever being U-shaped; an electro-magnet secured in the body portion; an armature attached to the upper ends of said U-shaped arm, said armature standing in alinement with the electro-magnet; spring-pressed plungers carried by the chuck in line with the U-shaped arm and adapted to move the same forwardly and to carry the armature out of contact with the magnet; and means for limiting the forward movement of the armature.

15. In a chuck, the combination of a hollow body portion; a slide or carriage mounted in ways formed in the body portion; a jaw mounted upon the carriage; means for securing adjustment of the jaw relatively to the carriage; an elbow lever fulcrumed upon the body portion, the lower short arm of said lever being in engagement with the slide or carriage; an armature connected to the upper U-shaped end of the long arm of said lever; a back plate secured to the body portion; spring-pressed plungers mounted in said back plate and bearing upon the U-shaped arm of the lever; an electro-magnet mounted in said back plate; and a driving gear secured to the back plate and overlying the electro-magnet.

16. In a chuck, the combination of a hollow body portion; a slide or carriage mounted in ways formed therein; a jaw mounted upon the carriage; a lever fulcrumed upon the body portion, one end of said lever being in engagment with the carriage; an armature connected to the opposite end of the lever; a back plate; an electro-magnet mounted in said back plate; a driving gear secured to the back plate and overlying the electro-magnet; a pair of contact rings carried by the back plate; and brushes bearing upon the rings.

In testimony whereof I have signed my name to this specification in the presence of two subscribing witnesses.

HOBART S. JOHNSON.

Witnesses:
 FLORENCE GILBERT,
 STANLEY C. HANK.